(12) United States Patent
Vickers

(10) Patent No.: US 7,540,350 B2
(45) Date of Patent: Jun. 2, 2009

(54) AUTO THEFT DETERRENT SYSTEM

(76) Inventor: Gregory L. Vickers, 76 Tyler St., Hyde Park, MA (US) 02136

( * ) Notice: Subject to any disclaimer, the term of this patent is extended or adjusted under 35 U.S.C. 154(b) by 334 days.

(21) Appl. No.: 11/481,986

(22) Filed: Jul. 6, 2006

(65) Prior Publication Data

US 2008/0006466 A1    Jan. 10, 2008

(51) Int. Cl.
*B60R 25/00* (2006.01)
(52) U.S. Cl. .................................................. 180/287
(58) Field of Classification Search ................ 180/287, 180/289, 271; 296/378.13, 378.14, 69; 248/424, 248/429, 551
See application file for complete search history.

(56) References Cited

U.S. PATENT DOCUMENTS

| 5,028,086 A | 7/1991 | Smith |
| 5,251,465 A | 10/1993 | Hwang |
| 5,277,043 A * | 1/1994 | Inashvili ....................... 70/238 |
| 5,529,372 A * | 6/1996 | Cohen ....................... 297/217.3 |
| 5,737,949 A | 4/1998 | Zenke |
| 6,578,395 B2 | 6/2003 | Takerian et al. |
| 6,901,780 B1 * | 6/2005 | Whinery ....................... 70/209 |

* cited by examiner

*Primary Examiner*—Faye M. Fleming

(57) ABSTRACT

A vehicle anti-theft mechanism moves the driver's unit into a location which prevents operation of the vehicle. The mechanism includes a bracket mechanism that fits onto the driver's seat unit and has two screws that movably connect a first bracket cross arm to a second bracket cross arm. A motor operates the screws to move the cross arms toward and away from each other when activated by a programmable remote control. The first cross arm is connected to the seat unit and the second cross arm is connected to the vehicle frame adjacent to the steering wheel of the vehicle to be stationary with respect to the first cross arm so that operation of the motor will move the first cross arm toward or away from the second cross arm, thereby moving the seat unit connected to the first cross arm toward and away from the second cross arm. The second cross arm thus moves the seat unit toward and away from the steering wheel. To lock the vehicle, the seat unit is moved close enough to the steering wheel to prevent operation of the vehicle due to interference between the seat unit and the steering wheel.

4 Claims, 1 Drawing Sheet

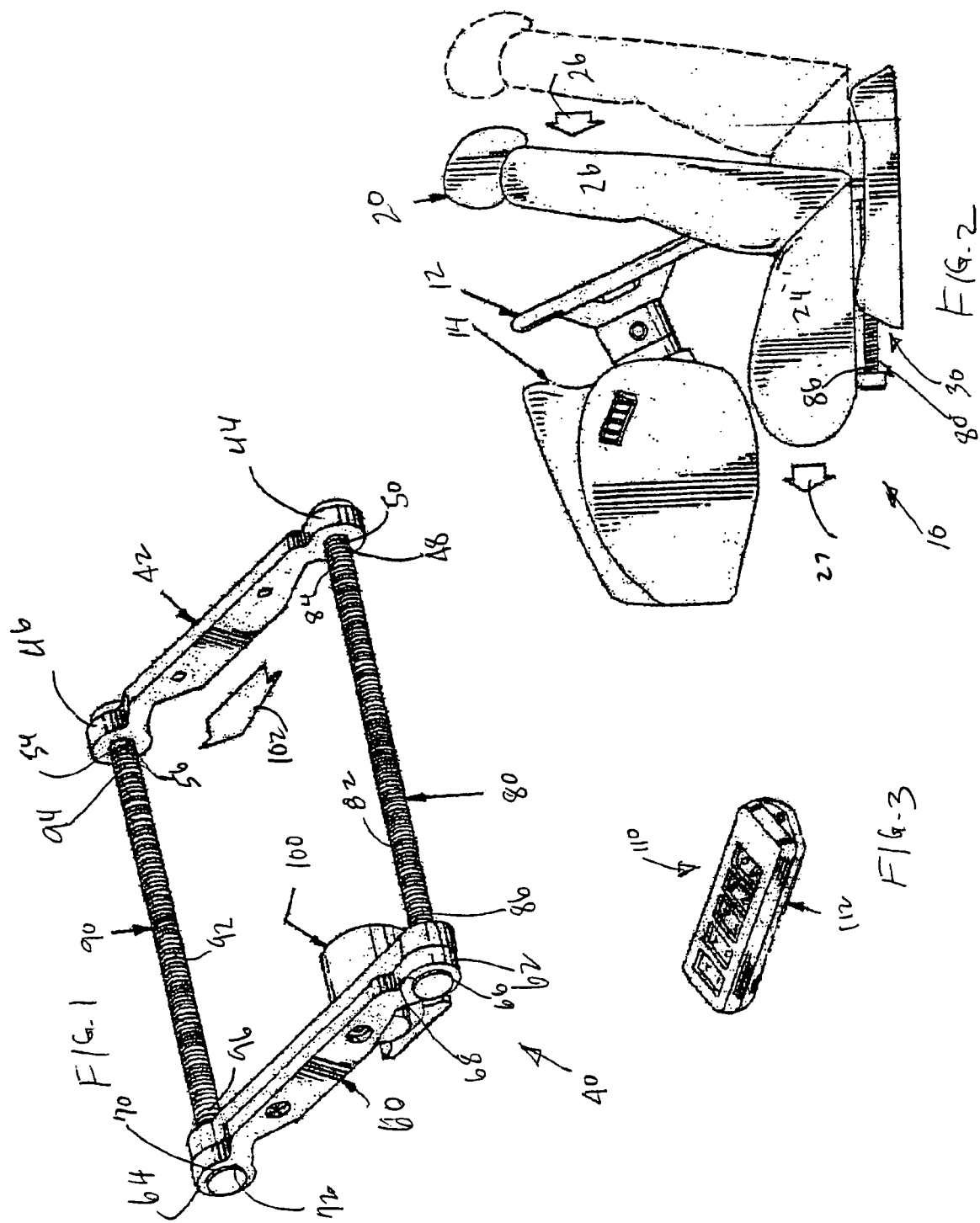

AUTO THEFT DETERRENT SYSTEM

TECHNICAL FIELD OF THE INVENTION

The present invention relates to the general art of vehicle anti-theft devices, and to the particular field of vehicle anti-theft devices which prevent unauthorized operation of the vehicle.

BACKGROUND OF THE INVENTION

Car theft has become a major problem throughout the United States, and many products have been developed to prevent and deter would-be thieves from stealing automobiles and the goods stored therein. The vast majority of products are releasably secured to the control functions of the automobile when the owner leaves the automobile, and are intended to prevent a thief from using the car in a conventional manner. For example, bars may be secured to the steering wheel in a manner preventing a thief from properly steering. Similarly, a rod may be positioned between the steering wheel and the brake pedal, or acceleration pedal, to prevent a thief from properly stopping, steering, or accelerating the vehicle. Devices are also known that may be secured to the gear shift to prevent a thief from shifting the automobile out of "Park". Such devices are separate from and not a part of the motor vehicle, thus requiring the user to install the device prior to departing from the motor vehicle.

Many of these devices are designed to be highly visible to discourage a thief prior to any attempt to break into the vehicle. These devices have been successful, since the stealing of an automobile with such a device would require extra effort by a potential thief and therefore another vehicle without such a protective device is usually chosen. While prior devices are generally effective in preventing a thief from operating the automobile once he or she has entered the vehicle, they often fail to provide the deterrent necessary to discourage the thief from damaging the automobile when he or she attempts to enter the automobile. That is, these products do not sufficiently signal the thief that any attempt to steal the automobile will be futile. As such, thieves often break windows and destroy car locks, only to find they cannot operate the automobile due to the theft prevention device. However, these devices do not limit the thieves' access to the seating area and a thief is, therefore, provided with a work space in which he or she may steal objects stored within or on the front instrument panel and dashboard.

In addition, these products fail to prevent a thief from stealing goods stored within the automobile, for example, air bags, a stereo system or any goods stored within the glove box. Since they are merely secured to the functional components of the automobile, the prior theft prevention devices leave the passenger compartment fully open. As a result, a thief is provided with full access to sit in the seat of the passenger compartment where he or she may steal air bags, stereo equipment, or goods stored in the glove box, despite the fact that the automobile cannot be stolen. The term "passenger compartment" is used throughout the remainder of this disclosure and should be understood to refer to the space between the front instrument panel and dashboard and the front seats of the vehicle. As such, the "passenger compartment" includes, but is not limited to, the seating area, the driver seat, the passenger seat, leg space, the glove compartment, the stereo console and the steering column. Still further, once the door of the automobile is opened by a thief, the thief can sit on the driver seat and unlock the lock device. The passers-by may not know that the person seated on the driver seat is the owner of the automobile or a thief.

More sophisticated theft prevention devices are also known in the prior art. These devices are commonly based upon complex electronic control systems. Devices of this type generally prevent unauthorized use of the automobile by disabling the car during ignition or after the thief has driven the automobile for a short time. In addition, these devices may also send a warning signal so the automobile owner can locate the stolen vehicle. As with the theft prevention devices discussed above, these electronic devices fail to provide the deterrent necessary to prevent a thief from attempting to steal the automobile. They also leave the passenger compartment open, providing the thief with access to the air bags, stereo equipment and other goods stored in the passenger compartment. Electronic theft prevention devices are also expensive and are often difficult to incorporate into previously existing automobiles. As with prior mechanical theft prevention devices, electronic theft prevention devices do not limit a would-be thief's access to the passenger compartment of the automobile. The thief is, therefore, provided with a work area in which he or she is provided full access to the front instrument panel and dashboard of the vehicle.

Furthermore, the installation process can be very complicated, and may require components within the vehicle to be detached for installing the locks. This may raise a possibility that due to faults during installation accidents may occur. Still further, some alarm type motor vehicle anti-theft devices are extremely sensitive and often inappropriately activated by weather conditions such as the wind.

As a review of the prior art reveals, a need continues to exist for a cost effective theft prevention device which prevents theft of the automobile, substantially limits access to the passenger compartment of the automobile, and provides a visible deterrent to theft.

SUMMARY OF THE INVENTION

The above-discussed disadvantages of the prior art are overcome by a vehicle anti-theft mechanism which moves the driver's seat as close as possible to the dashboard into a location which prevents operation of the vehicle. In this manner, an unauthorized driver cannot have access to the gas pedal. The mechanism includes a bracket mechanism that fits onto the driver's seat and has two screws that movably connect a first bracket cross arm to a second bracket cross arm. A motor operates the screws to move the cross arms toward and away from each other when activated by a remote control. The first cross arm is connected to the seat and the second cross arm is connected to the vehicle frame adjacent to the steering wheel of the vehicle to be stationary with respect to the first cross arm so that operation of the motor will move the first cross arm toward or away from the second cross arm, thereby moving the seat connected to the first cross arm toward and away from the second cross arm. The second cross arm thus moves the seat toward and away from the steering wheel. To lock the vehicle, the seat is moved so close enough to the dash board and the steering wheel to prevent operation of the vehicle due to interference between the seat and the steering wheel.

The remote operation of the mechanism will permit a user to lock the car or unlock the car even though they are not near the car. Therefore, if the user forgets to set the alarm or the mechanism when the leave the car, they can still effectively lock the car from a distance. Further, the mechanism of the present invention can be set to automatically move the seat into the locking position when the vehicle is locked and to move the seat back into the driving position when the vehicle is unlocked. A remote control unit controls operation of the seat mechanism and is programmed so that a code must be entered in order to move the seat back into a location which will permit operation of the vehicle.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 is a perspective view of a vehicle anti-theft mechanism embodying the present invention.

FIG. 2 is a side view of a vehicle seat which incorporates the mechanism of the present invention.

FIG. 3 is a perspective view of a remote control unit included in the mechanism of the present invention.

DETAILED DESCRIPTION OF THE INVENTION

Referring to the figures, it can be understood that the present invention is embodied in a vehicle anti-theft mechanism 10 embodying the present invention. Mechanism 10 comprises a motor vehicle having a steering wheel 12 that is located adjacent to a front dashboard 14 in the usual manner.

A vehicle driver's seat unit 20 has a sitting support portion 24 and a back support portion 27. As indicated by arrows 27 in FIG. 2, the entire seat is movable between a forward position shown in solid lines in FIG. 2 in which the there is not sufficient space between the bottom side of the dashboard 14 and the support portion 24 to access the gas pedal and the brake of the vehicle in order to operate the vehicle. In a rear position as shown in dotted lines in FIG. 2, there may be sufficient space to operate the gas pedal and the brake to operate the vehicle. As such, in the locking position of the seat unit, the seat unit 20 or the support portion 24 may be close to the dashboard as possible or in contact with the dashboard and is so close that operation of the vehicle is prevented.

A seat mount 30 supports the driver's seat unit on the motor vehicle and is operated in a well known manner to adjust the position of the driver's seat for driving. A seat unit moving mechanism 40 is shown in FIG. 1 and includes a first cross arm support 42 fixedly secured to the seat unit The first cross arm support has a first end 44 and a second end 46. A first bore 48 is defined through first end 44. The first cross arm support bore is internally threaded as indicated at 50 adjacent to the first bore.

First cross arm support 42 further includes a second bore 54 defined through second end 46 with the first cross arm support is internally threaded as indicated at 56 adjacent to the second bore. A second cross arm support 60 is fixedly secured to seat mount 30. Second cross arm support 60 has a first end 62 and a second end 64.

A first bore 66 is defined through first end 62 of second cross arm support 60. Second cross arm support is internally threaded as indicated at 68 adjacent to first bore 66. A second bore 70 is defined through second end 64 of the second cross arm support. The second cross arm support is internally threaded as indicated at 72 adjacent to second bore 70 of the second cross arm support.

A first screw element 80 has an external thread 82, a first end 84 which is threadably connected to first cross arm support 42 adjacent to first bore 48 of the first cross arm support and a second end 86 which is threadably connected to second cross arm support 60 adjacent to first bore 66 of the second cross arm support. A second screw element 90 has an external thread 92, a first end 94 which is threadably connected to first cross arm support 42 adjacent to second bore 54 of the first cross arm support and a second end 96 which is threadably connected to second cross arm support 60 adjacent to second bore 70 of the second cross arm support.

A motor unit 100 is mounted on second cross arm support 60 and is operatively connected to the first and second screw elements to rotate the first and second screw elements when the motor is activated. The motor is connected to the screw elements in a manner well known to those skilled in the art. The details of the connection between the motor and the screw elements are not important to this invention and will not be claimed. As such, the details of the operative connection between the motor and the screw elements will not be discussed. The motor is adapted to rotate in first and second directions, with the first direction causing the screw elements to rotate in a direction that moves the first cross arm support in the direction indicated by arrow 102 in FIG. 1 towards the second cross arm support to move the seat unit forward towards the steering wheel and into a vehicle locking position. The locking position places the seat unit into a location where operation of the vehicle is not possible. The second direction of motor movement causes the screw elements to rotate in a direction that moves the first cross arm support away from the second cross arm support to move the seat unit towards the rear position away from the steering wheel and into a vehicle driving position in which there is sufficient space adjacent to the steering wheel to operate the vehicle.

A remote control system 110 is used to operate the motor unit. The remote control system includes a hand-held unit 112. The remote control is programmed so that a pass code must be entered before the seat can be moved back away from the locking position.

A vehicle locking system can be included, and the motor unit is connected to the locking system to move the seat into the locking position when the vehicle locking system is activated and to move the seat into the vehicle driving position when the locking system is de-activated once a pass code is entered.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:
1. A vehicle anti-theft mechanism comprising:
   A) a vehicle having a steering wheel;
   B) a vehicle driver's seat unit which has a supporting portion and a back support portion, the seat being movable between a forward position in which the seat unit is in a position which makes operation of the vehicle impossible, and a rear position in which the seat unit is in a position which permits operation of the vehicle;
   C) a seat mount which supports the seat unit on a motor vehicle;

C) a seat unit moving mechanism which includes
  (1) a first cross arm support fixedly secured to the seat unit, the first cross arm support having
    (a) a first end,
    (b) a second end,
    (c) a first bore defined through the first end, the first cross arm support bore being internally threaded adjacent to the first bore, and
    (d) a second bore defined through the second end, the first cross arm support being internally threaded adjacent to the second bore,
  (2) a second cross arm support fixedly secured to the seat mount, the second cross arm support having
    (a) a first end,
    (b) a second end,
    (c) a first bore defined through the first end of the second cross arm support, the second cross arm support being internally threaded adjacent to the first bore of the second cross arm support, and
    (d) a second bore defined through the second end of the second cross arm support, the second cross arm support being internally threaded adjacent to the second bore of the second cross arm support,
  (3) a first screw element having
    (a) an external thread,
    (b) a first end which is threadably connected to the first cross arm support adjacent to the first bore of the first cross arm support, and
    (c) a second end which is threadably connected to the second cross arm support adjacent to the first bore of the second cross arm support,
  (4) a second screw element having
    (a) an external thread,
    (b) a first end which is threadably connected to the first cross arm support adjacent to the second bore of the first cross arm support, and
    (c) a second end which is threadably connected to the second cross arm support adjacent to the second bore of the second cross arm support,
  (5) a motor unit mounted on the second cross arm support and operatively connected to the first and second screw elements to rotate the first and second screw elements when the motor is activated, the motor being adapted to rotate in first and second directions, with the first direction causing the screw elements to rotate in a direction that moves the first cross arm support towards the second cross arm support to move the seat unit forward towards the steering wheel and into a vehicle locking position, the locking position placing the seat unit in a location where there is not sufficient space adjacent to the steering wheel to operate the vehicle and the second direction causing the screw elements to rotate in a direction that moves the first cross arm support away from the second cross arm support to move the seat unit towards the rear position away from the steering wheel and into a vehicle driving position in which there is sufficient space adjacent to the steering wheel to operate the vehicle; and
D) a remote control system for operating the motor unit, the remote control system including a programmable hand-held unit.

2. The vehicle anti-theft mechanism defined in claim 1 wherein the vehicle seat unit includes a moving system and the motor unit is connected to the moving system.

3. The vehicle anti-theft mechanism defined in claim 1 further including a vehicle locking system and the motor unit is connected to the locking system to move the unit into the locking position when the vehicle locking system is activated and to move the seat unit into the vehicle driving position when the locking system is de-activated.

4. A vehicle anti-theft mechanism comprising:
A) a having a steering wheel;
B) a vehicle driver's seat unit which has a supporting portion and a back support portion, the seat unit being movable between a forward position in which there is not sufficient space adjacent to the steering wheel to operate the vehicle and a rear position in which the seat unit is in a location in which there is sufficient space adjacent to the steering wheel to operate the vehicle;
C) a seat mount which supports the seat unit on a motor vehicle;
D) a unit moving mechanism which includes
  (1) a first cross arm support fixedly secured to the seat unit,
  (2) a second cross arm support fixedly secured to the seat mount,
  (3) a first screw element threadably connected to the first cross arm support, and
    (a) a second screw element threadably connected to the second cross arm support, and
  (4) a motor unit mounted on the second cross arm support and operatively connected to the first and second screw elements to rotate the first and second screw elements when the motor is activated, the motor being adapted to rotate in first and second directions, with the first direction causing the screw elements to rotate in a direction that moves the first cross arm support towards the second cross arm support to move the seat unit forward towards the steering wheel and into a vehicle locking position, the locking position placing the seat unit in a location where there is not sufficient space adjacent to the steering wheel to operate the vehicle and the second direction causing the screw elements to rotate in a direction that moves the first cross arm support away from the second cross arm support to move the unit towards the rear position away from the steering wheel and into a vehicle driving position in which there is sufficient space adjacent to the steering wheel to operate the vehicle.

* * * * *